United States Patent
Wong et al.

(10) Patent No.: US 9,206,740 B2
(45) Date of Patent: Dec. 8, 2015

(54) LIQUID INJECTION INLET PARTICLE SEPARATOR SYSTEMS AND METHODS

(71) Applicant: HONEYWELL INTERNATIONAL INC., Morristown, NJ (US)

(72) Inventors: Yates Wong, Humboldt, AZ (US); Eric Blumer, Scottsdale, AZ (US); Eduardo Guerra, Queen Creek, AZ (US); Yogendra Yogi Sheoran, Scottsdale, AZ (US); Zedic Daniel Judd, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 424 days.

(21) Appl. No.: 13/734,875

(22) Filed: Jan. 4, 2013

(65) Prior Publication Data

US 2014/0190347 A1    Jul. 10, 2014

(51) Int. Cl.
*F02C 7/052* (2006.01)
*F01D 25/00* (2006.01)

(52) U.S. Cl.
CPC .............. *F02C 7/052* (2013.01); *F01D 25/002* (2013.01); *F05D 2260/607* (2013.01); *Y02T 50/671* (2013.01); *Y02T 50/675* (2013.01)

(58) Field of Classification Search
CPC . F01D 25/002; F02C 7/052; F05D 2260/607; Y02T 50/671; Y02T 50/675
See application file for complete search history.

(56) References Cited

U.S. PATENT DOCUMENTS

| | | | |
|---|---|---|---|
| 3,224,170 A * | 12/1965 | Iwanaga et al. | 96/342 |
| 3,521,431 A * | 7/1970 | Buckley et al. | 55/306 |
| 3,601,313 A | 8/1971 | Berg | |
| 3,668,835 A | 6/1972 | Vicard | |
| 3,766,719 A * | 10/1973 | McAnally, III | 55/306 |
| 4,098,594 A * | 7/1978 | Shorr et al. | 55/403 |
| 4,169,714 A | 10/1979 | Calvert | |
| 4,346,860 A * | 8/1982 | Tedstone | 244/53 B |
| 4,425,756 A * | 1/1984 | Ballard et al. | 60/39.092 |
| 4,509,962 A * | 4/1985 | Breitman et al. | 55/306 |
| 4,909,161 A | 3/1990 | Germain | |
| 5,039,317 A * | 8/1991 | Thompson et al. | 95/272 |
| 5,125,230 A | 6/1992 | Leonard | |
| 5,174,111 A * | 12/1992 | Nomura et al. | 60/285 |
| 5,678,493 A | 10/1997 | Kelley et al. | |
| 6,074,458 A | 6/2000 | Bittner et al. | |
| 6,134,874 A * | 10/2000 | Stoten | 60/39.092 |
| 6,499,285 B1 * | 12/2002 | Snyder | 60/39.092 |
| 6,527,829 B1 | 3/2003 | Malkamaki et al. | |
| 6,609,360 B2 | 8/2003 | Utamura | |
| 6,698,180 B2 * | 3/2004 | Snyder | 60/39.092 |
| 6,698,387 B1 * | 3/2004 | McFarland et al. | 123/25 A |
| 7,013,845 B1 * | 3/2006 | McFarland et al. | 123/3 |

(Continued)

*Primary Examiner* — Christopher P Jones
(74) *Attorney, Agent, or Firm* — Ingrassia Fisher & Lorenz, P.C.

(57) ABSTRACT

An inlet particle separator system for a vehicle engine includes a separator assembly and a liquid injection system. The separator assembly defines an inlet flow path for receiving inlet air and includes a scavenge flow path and an engine flow path downstream of the inlet flow path. The separator assembly is configured to separate the inlet air into scavenge air and engine air such that the scavenge air is directed from the inlet flow path into the scavenge flow path and the engine air is directed from the inlet flow path into the engine flow path. The liquid injection system is coupled to the separator assembly and configured to introduce a diffused liquid into the inlet air flowing through the separator assembly.

20 Claims, 6 Drawing Sheets

(56) References Cited

U.S. PATENT DOCUMENTS

| | | | |
|---|---|---|---|
| 7,296,395 B1* | 11/2007 | Hartman et al. | 60/39.092 |
| 7,678,165 B2* | 3/2010 | Tingle et al. | 55/306 |
| 7,758,675 B2 | 7/2010 | Naito et al. | |
| 7,802,433 B2* | 9/2010 | Higgins | 60/779 |
| 7,927,408 B2* | 4/2011 | Sheoran et al. | 96/397 |
| 8,043,413 B2 | 10/2011 | Chillar et al. | |
| 2003/0196548 A1* | 10/2003 | Hartman | 95/8 |
| 2011/0252771 A1* | 10/2011 | Fujinaga et al. | 60/295 |
| 2014/0144123 A1* | 5/2014 | Judd et al. | 60/39.092 |
| 2014/0260211 A1* | 9/2014 | Patchett et al. | 60/297 |
| 2015/0030435 A1* | 1/2015 | Howe et al. | 415/121.2 |

\* cited by examiner

LIQUID INJECTION INLET PARTICLE SEPARATOR SYSTEMS AND METHODS

TECHNICAL FIELD

The present invention generally relates to fluid inlets for vehicle engines, and more particularly relates to methods and systems for separating particles flowing into vehicle engines, such as aircraft engines.

BACKGROUND

During operation, fluids such as air are pulled from the atmosphere into an engine and used to generate energy to propel the vehicle. The fluids may contain undesirable particles, such as sand and dust, which may cause issues for engine components. In order to prevent such issues, at least a portion of the undesirable particles are removed from the fluids using an inlet particle separator, such as an inertial inlet particle separator.

A conventional inertial inlet particle separator typically includes a duct system with a fluid inlet that transitions into 1) a scavenge channel that forms an in-line fluid path with the fluid inlet and 2) a clean channel that branches off from the in-line fluid path. As the name suggests, inertia tends to cause the particles to travel in a straight line rather than follow the curved fluid flow path. This being the case, particles and a portion of the air carrying the particles tend to flow straight into the scavenge channel rather than curve into the clean intake channel. As such, the clean air is separated from the contaminated air and guided into the engine. The contaminated air is guided from the scavenge channel into a blower or other type of suction source and discharged. Approximately 15-25% of the fluid entering the fluid inlet typically enters the scavenge channel, while the remaining fluid and lighter particles enter the clean channel. As designed, the fluid entering the scavenge channel includes most of the larger particles such that only a small percentage of particles enter the engine through the clean channel, thereby protecting engine components.

Although some conventional inertial inlet particle separators are successful in providing relatively clean fluid to the engine, it may be challenging to efficiently remove particles. This is particularly true with respect to fine particles, especially in a design that utilizes swirl airflow, centrifugal forces, and/or particle momentum for collection. This may result in poor separation efficiency for smaller particles, which may lead to erosion, obstruction, or glassing issues.

Accordingly, it is desirable to provide improved methods and systems for separating particles from inlet fluid for a vehicle engine, particularly for small particles. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an inlet particle separator system for a vehicle engine includes a separator assembly and a liquid injection system. The separator assembly defines an inlet flow path for receiving inlet air and includes a scavenge flow path and an engine flow path downstream of the inlet flow path. The separator assembly is configured to separate the inlet air into scavenge air and engine air such that the scavenge air is directed from the inlet flow path into the scavenge flow path and the engine air is directed from the inlet flow path into the engine flow path. The liquid injection system is coupled to the separator assembly and configured to introduce a diffused liquid into the inlet air flowing through the separator assembly.

In accordance with an exemplary embodiment, a method is provided for separating particles from inlet air in an inlet particle separator system. The method includes introducing diffused liquid into the inlet air such that at least some of the particles within the inlet air cluster into clustered particles; and separating the inlet into scavenge air entering a scavenge flow path and engine air entering an engine flow path, the scavenge air include the clustered particles.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Embodiments described herein provide inlet particle separator systems and methods for separating particles from inlet air and providing the resulting clean air to an engine. Particularly, the separator systems and methods include a liquid injection system that introduces a diffused liquid into the inlet flow path. The diffused liquid functions to cluster the smaller particles flowing with the inlet air into larger, clustered particles. The larger particles may be more efficiently removed as compared to the smaller particles. The clustered particles may be directed into a collector assembly for removal. In some embodiments, the clustered particles may be removed by an electrohydrodynamic (EHD) system. As a result, such systems and methods may increase separation and operation efficiency.

Figure 1:
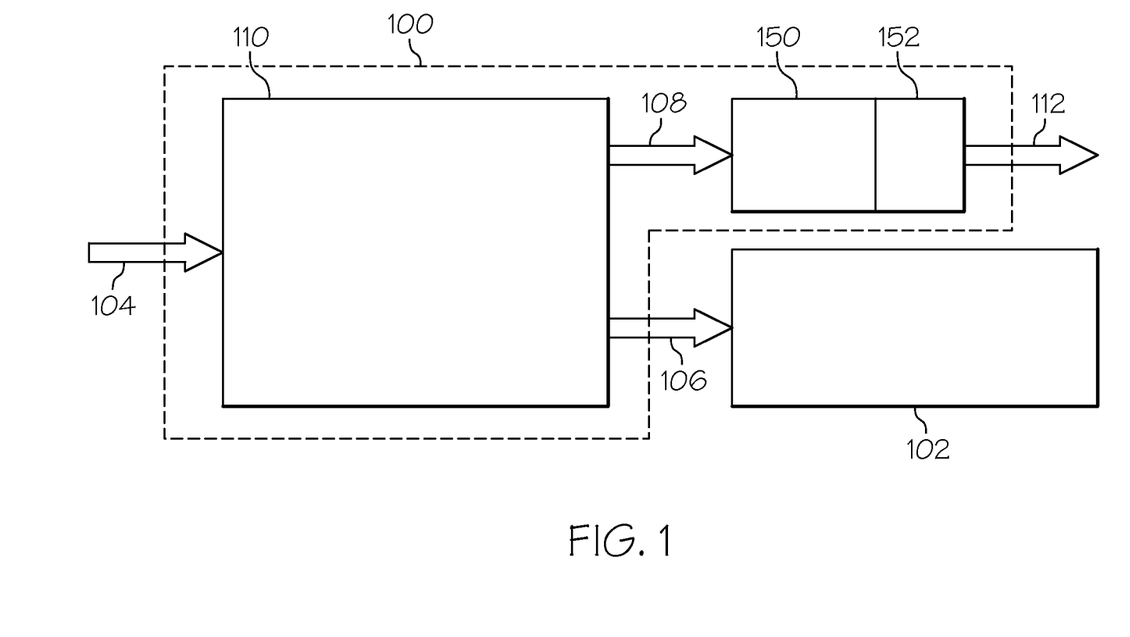
FIG. 1 is a block diagram of an inlet particle separator system for supplying clean air to an engine in accordance with an exemplary embodiment.

FIG. 1 is an exemplary block diagram of an inlet particle separator system 100 coupled to an engine 102. The engine 102 may be, for example, a turbine engine of an aeronautical vehicle such as a helicopter. The engine 102 receives air from the separator system 100, compresses the air to elevate the air pressure, adds fuel, ignites the mixture, and uses the combustion gases to drive a series of turbines, the work from which may be used to propel the vehicle or generate electricity.

Particularly, and as discussed in further detail below, the separator system 100 receives inlet air 104 and provides relatively clean air 106 for use by the engine 102. The separator system 100 includes an inlet particle separator assembly 110 that receives the inlet air 104. The separator assembly 110 removes dirt and other particles from the inlet air 104 to result in engine air 106 provided to the engine 102 and scavenge air 108, e.g., the separator assembly 110 separates the inlet air 102 into the engine air 106 and the scavenge air 108. The scavenge air 108 is drawn into a collector assembly 150 by a fan 152 and then exhausted into the atmosphere as exhaust air 112. In one embodiment, the fan 152 may be electric and function to induce the scavenge air 108 into the separator system 100. Although not shown, the separator system 100 may include sensors, controllers, adjustment mechanisms and/or other components.

Since the scavenge air 108 must be separated and exhausted, drawing scavenge air 108 in addition to engine air 106 through the inlet results in some pressure loss to the engine 102. If unaddressed, excess pressure loss may contribute to degraded performance of the engine 102 and/or require increased operation of the fan 152 with the associated energy cost. As described in greater detail below, the collector assembly 150 may be configured to enable a more efficient operation of the separator system 100, and thus, a more efficient operation of the engine 102.

Figure 2:
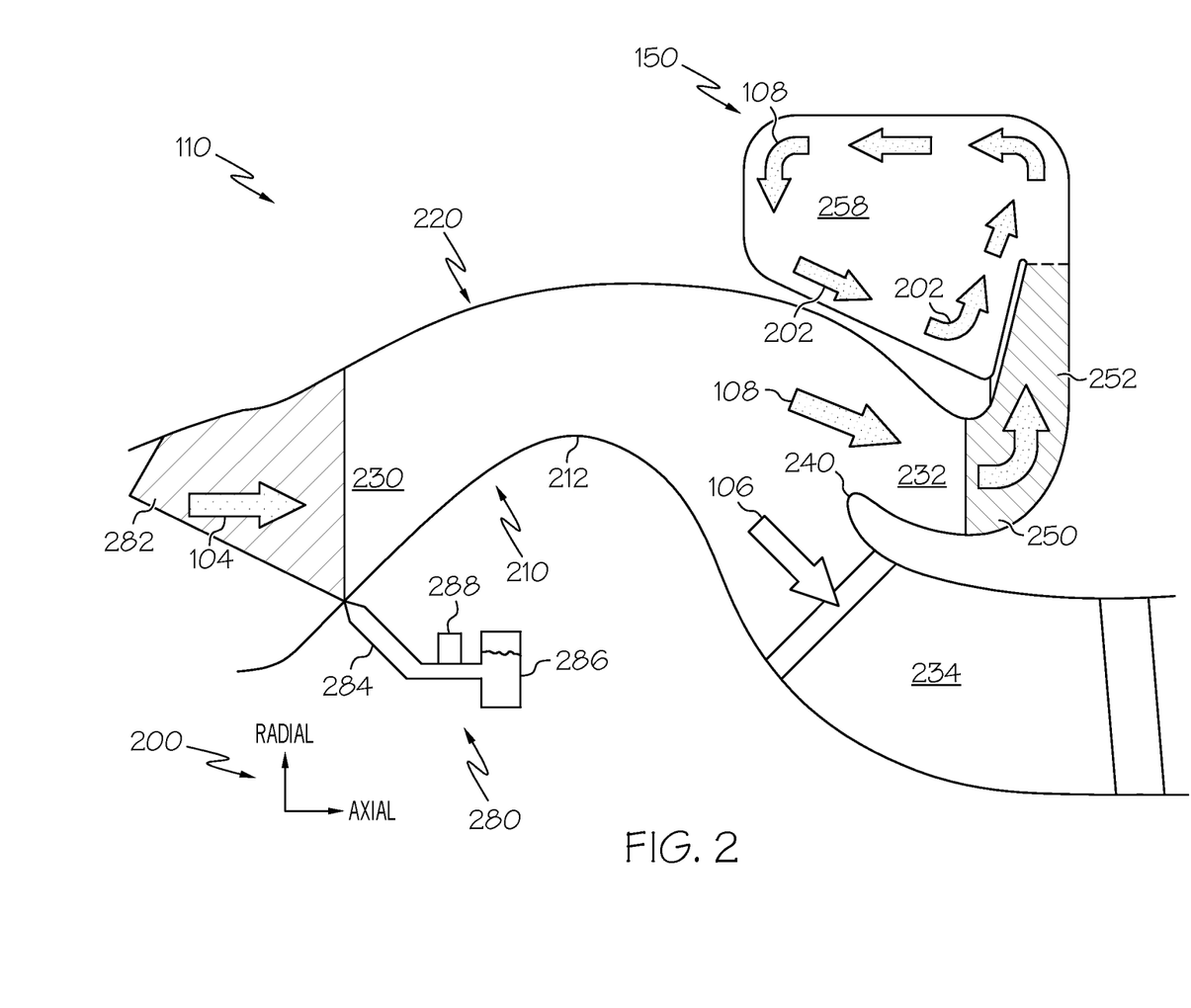
FIG. 2 is a partial, more detailed cross-sectional view of the separator system of FIG. 1 in accordance with an exemplary embodiment.

FIG. 2 is a partial, more detailed cross-sectional view of the separator system 100 of FIG. 1 in accordance with an exemplary embodiment. In particular, FIG. 2 illustrates a portion of the separator assembly 110 and the collector assembly 150. As described above, inlet air 104 enters the separator assembly 110. The inlet air 104 may include dirt, sand, dust, and other debris that may be detrimental to the engine 102. As such, the separator assembly 110 may separate the inlet air 104 into the relatively dirty scavenge air 108 and the relatively clean engine air 106. Scavenge air 108 with debris and dirt particles flows into the collector assembly 150, while relatively clean engine air 106 flows from the separator assembly 110 into the engine 102 (FIG. 1), as described in more detail below. As used herein, the term "axial" generally refers to an orientation or direction parallel to the engine centerline and the term "radial" generally refers to an orientation or direction perpendicular to the engine centerline. The axial and radial directions are indicated by legend 200 in FIG. 2.

The separator assembly 110 is defined by a hub 210 and a shroud 220. The shroud 220 typically circumscribes the hub 210 to define an annular flow path (or inlet flow path) 230 for the inlet air 104 in an upstream portion of the separator assembly 110. A splitter 240 is positioned to divide the flow path 230 into a scavenge flow path (or channel) 232 and an engine (or clean) flow path (or channel) 234. As such, the scavenge flow path 232 is defined by the splitter 240 and the shroud 220, and the engine flow path 234 is defined by the splitter 240 and the hub 210. As described in greater detail below, the scavenge flow path 232 is fluidly coupled to the collector assembly 150, and the engine flow path 234 is fluidly coupled to the engine 102.

The hub 210 and shroud 220 are configured to separate the inlet air 104, which may include dirt and other debris, into the relatively clean engine air 106 and scavenge air 108, which carries the debris into the collector assembly 150. Particularly, the hub 210 includes a radial element 212 that forces the inlet air 104 from a generally axial orientation into a partially outward radial direction. As the inlet air 104 flows radially outward, the debris that forms the scavenge air 108 tends to engage the shroud 220 and maintain a flow along the shroud 220 into the scavenge flow path 232 as a result of inertia. As discussed below, a liquid injection system 280 may be provided to group the debris into larger particles to facilitate this function. The relatively clean engine air 106 may flow radially inward and radially around the radial element 212, closer to the hub 210, and into the engine flow path 234. As such, the engine air 106 is separated from the scavenge air 108.

As shown in FIG. 2, the scavenge flow path 232 is coupled to an inlet 250 of the collector assembly 150. In one exemplary embodiment, the collector assembly 150 generally includes a radial passage 252 extending from the inlet 250. The collector assembly 150 further includes a collector body 258 extending from the radial passage 252. In particular, the collector body 258 is coupled to the radial passage 252. The collector body 258 may be defined by any number of walls arranged to direct the scavenge air 108 out of the collector assembly 150. In the depicted embodiment, the collector assembly 150 is a scroll or partial scroll that collects the scavenge air 108 and directs the scavenge air 108 in a circumferential flow path to an outlet (not shown) for discharge.

As also shown in FIG. 2, the separator assembly 110 further includes a liquid injection system 280. In general, the liquid injection system 280 introduces an atomized or diffused liquid 282 into the flow path 230 to facilitate the separation of the scavenge air 104 from the engine air 106. In the embodiment of FIG. 2, the liquid injection system 280 includes one or more nozzles or diffusers 284, a source 286, and a controller 288. The nozzle 284 receives liquid from the source 286 and atomizes or otherwise diffuses the liquid based on signals from the controller 288. Although not shown, the liquid injection system 280 may include any suitable pump or other components to introduce the liquid into the flow path. In one exemplary embodiment, the liquid injection system 280 may include a series of axially and/or circumferentially arranged nozzles 284 that selectively introduce the liquid with minimal blockage and pressure drop.

In the depicted embodiment, the liquid injection system 280 introduces the liquid 282 from the hub 210, near the inlet of the separator assembly 110 and upstream of the radial element 212 of the hub 210. As discussed in greater detail below, other arrangements may be provided. In other embodiments, the liquid injection system 280 may introduce the diffused liquid 282 upstream of the inlet of the separator assembly 110. As also shown in the depicted embodiment, the liquid injection system 280 directs the diffused liquid in a radially outward and forward direction (e.g., away from the engine), although other directions and arrangements may be possible.

During operation, the diffused liquid 282 introduced by the liquid injection system 280 functions to cluster particles in the inlet air 104 as a result of the cohesion or adhesion effect of the liquid. As such, the particles cluster with the liquid droplets to become larger or clustered particles, which have a greater mass than the dry particles. The heavier particles tend to follow the radially outward path of the flow path, e.g., towards the shroud 220, into the scavenge flow path 232. The adhesion and surface tension effect of the liquid assists in maintaining the particles against or proximate to the shroud 220, towards the scavenge flow path 232 and away from the engine flow path 234. In other words, the heavier particles are more likely to flow into the scavenge flow path 232 than lighter particles. The liquid injection system 280 functions to create heavier particles from the lighter particles, thereby improving efficiency. In some embodiments, the constant incoming flow of particles and fluid assists in evacuating any buildup along the wall surfaces of the shroud 220. As an additional benefit, the diffused liquid 282 may result in an evaporative cooling effect of engine inlet air that functions to enhance engine efficiency.

In one exemplary embodiment, the liquid injection system 280 may operate during all engine conditions. In other exemplary embodiments, the exemplary embodiment, the liquid injection system 280 may be electrically actuated by the controller 288, either automatically and/or based on pilot commands, to selectively activate or deactivate injection of the diffused liquid 282. For example, the liquid injection system 280 may be selectively activated to operate only during flight conditions that result in ingestion of smaller particles.

Any suitable liquid may be provided as the diffused liquid 282, including water, alcohol, or a mixture of alcohol. As an example, water has a natural adhesion effect to nearly all contacted foreign materials, as well as cohesive characteristics to maintain bound particles. As noted above, the liquid may be selected to additionally provide evaporative cooling. Other considerations may include detergents to assist in foaming, and thus adhesion, and/or cleansing properties for engine hardware. In still further embodiments, liquids such as water methanol may be sued to provide a power boost to the engine. In aircraft installations, the liquid source 286 may be partially or completely filled prior to take-off and/or liquid may be collected by atmospheric water generators such as condensation from air conditioning, electron control system, and other sources during flight.

As introduced above, liquid delivery from the source 286 and through the nozzle 284 may be provided through electric pump, ejector, reservoir pressurization, or any other suitable mechanism for transferring liquid. The flow rate of the liquid may be predetermined, for example, for a given operating environmental condition, engine operation condition, and type of fluid. In one exemplary embodiment, sensors may be implemented along the separator assembly 110, e.g., along the flow path 230 to provide a closed loop feedback to the controller 288 for adjustment and actuation of the liquid injection system 280.

The controller 288 may be implemented in wide variety of platforms, such as a computer system that includes a processor, an interface, a storage device, a bus, and a memory that stores the start logic as a program. The processor performs the computation and control functions of the controllers and may include any type of processor, including integrated circuits such as a microprocessor implemented on separate systems or as part of an overall vehicle control, navigation, avionics, communication or diagnostic system. During operation, the processor executes the programs contained within memory, which may be any type of suitable memory. The bus serves to transmit programs, data, status and other information or signals between the various components of engine system and may include any suitable physical or logical mechanisms of connecting computer systems and components. In some embodiments, the controller 288 may be coupled to larger control systems, such as a flight management system (not shown). Although not shown, the separator assembly 110 and/or collector assembly 150 may be adjusted to provide drainage of the collected liquid in the scavenge air 108.

As noted above, the exemplary embodiment depicted in FIG. 2 is one possible configuration. The number, placement and arrangement of the atomizers or nozzles, as well as the size of the liquid droplets, may be adjusted to provide advantageous coalescing performance of dirt particles in the flow path 230. Similarly, adjustments to the flow paths 230, 232, 234 may be provided to optimize efficiency.

Figure 3:
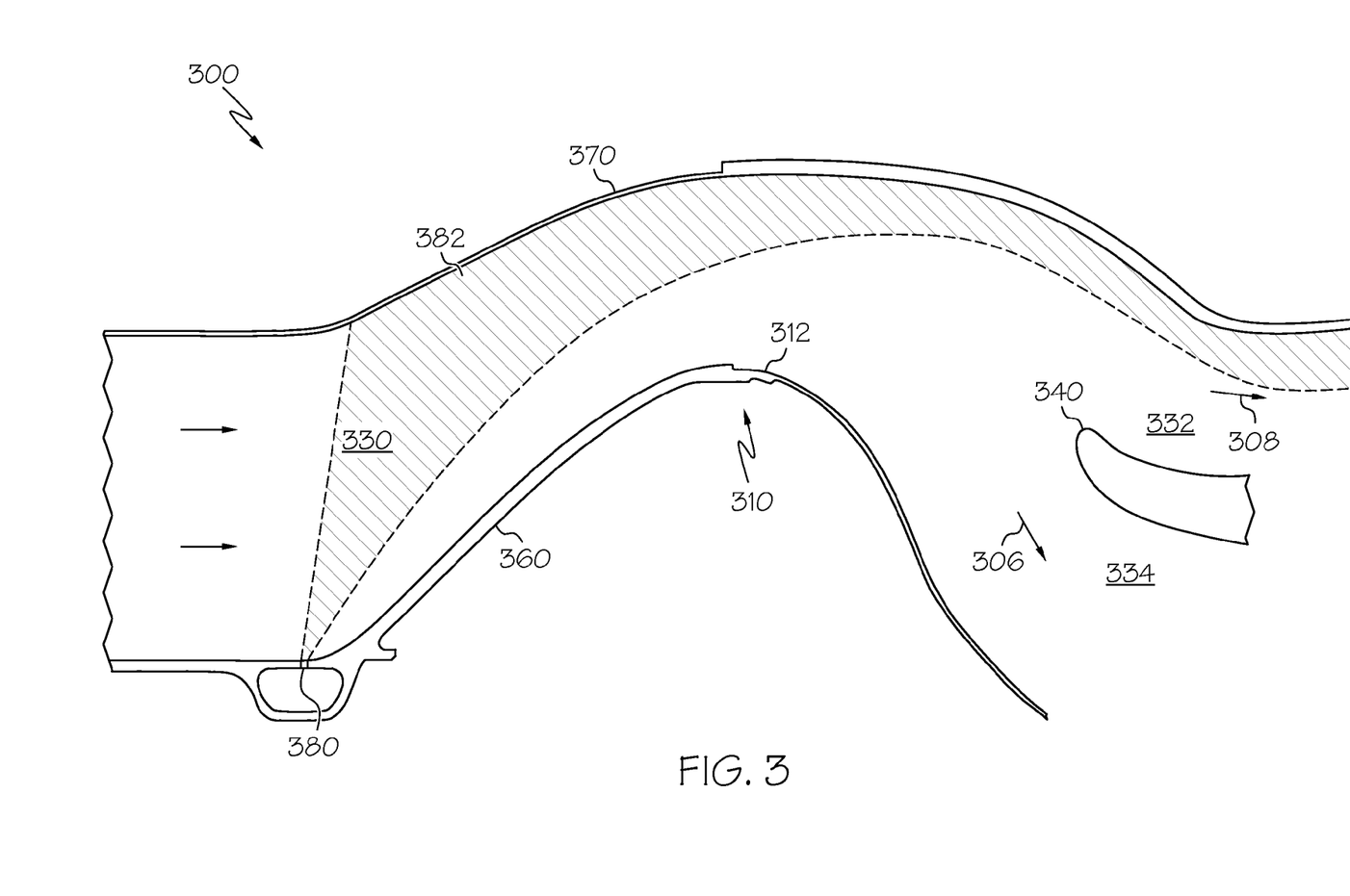
FIG. 3 is a partial, cross-sectional view of a separator system in accordance with another exemplary embodiment.

An example of an alternate configuration is depicted in FIG. 3. FIG. 3 is a partial cross-sectional view of a separator system 300 in accordance with another exemplary embodiment. As above, the separator system includes a separator assembly 310 and a collector assembly (not shown) such that inlet air 304 enters the separator assembly 310 and is separated into scavenge air 308 and engine air 306. Scavenge air 308 with debris and dirt particles flows into the collector assembly, while relatively clean engine air 306 flows from the separator assembly 310 into the engine.

As also discussed above, the separator assembly 310 is defined by a hub 360 and a shroud 370 to define an annular inlet flow path 330 for the inlet air 304 in an upstream portion of the separator assembly 310. A splitter 340 is positioned to divide the flow path 330 into a scavenge flow path (or channel) 332 and an engine (or clean) flow path (or channel) 334. The separator assembly 310 is configured to separate the inlet air 104, which may include dirt and other debris, into the relatively clean engine air 106 and scavenge air 108, which carries the debris into the collector assembly. Particularly, the hub 360 includes a radial element 312 that forces the inlet air 330 from a generally axial orientation into a partially outward radial direction. As the inlet air 330 flows radially outward, the debris that forms the scavenge air 332 tends to engage the shroud 370 and maintain a flow along the shroud 370 into the scavenge flow path 332 as a result of inertia. However, the relatively clean engine air 306 may flow radially inward and radially around the radial element 312, closer to the hub 360, and into the engine flow path 334. As such, the engine air 334 is separated from the scavenge air 332.

In the embodiment depicted by FIG. 3, a liquid injection system 380 is provided. As above, the liquid injection system 380 introduces a diffused or atomized liquid 382 into the flow path 330. In the depicted embodiment, the liquid injection system 380 introduces the liquid 382 from the hub 360, near the inlet of the separator assembly 310. As also shown in the depicted embodiment, the liquid injection system 380 directs the diffused liquid 382 in a radially outward and aft direction (e.g., towards the engine), although other directions and arrangements may be possible. In particular, a portion of the diffused liquid 382 is directed downstream towards the scavenge path 332 to facilitate flow of the diffused liquid 382 and adhered and clustered particles into the collector assembly.

Figure 4:
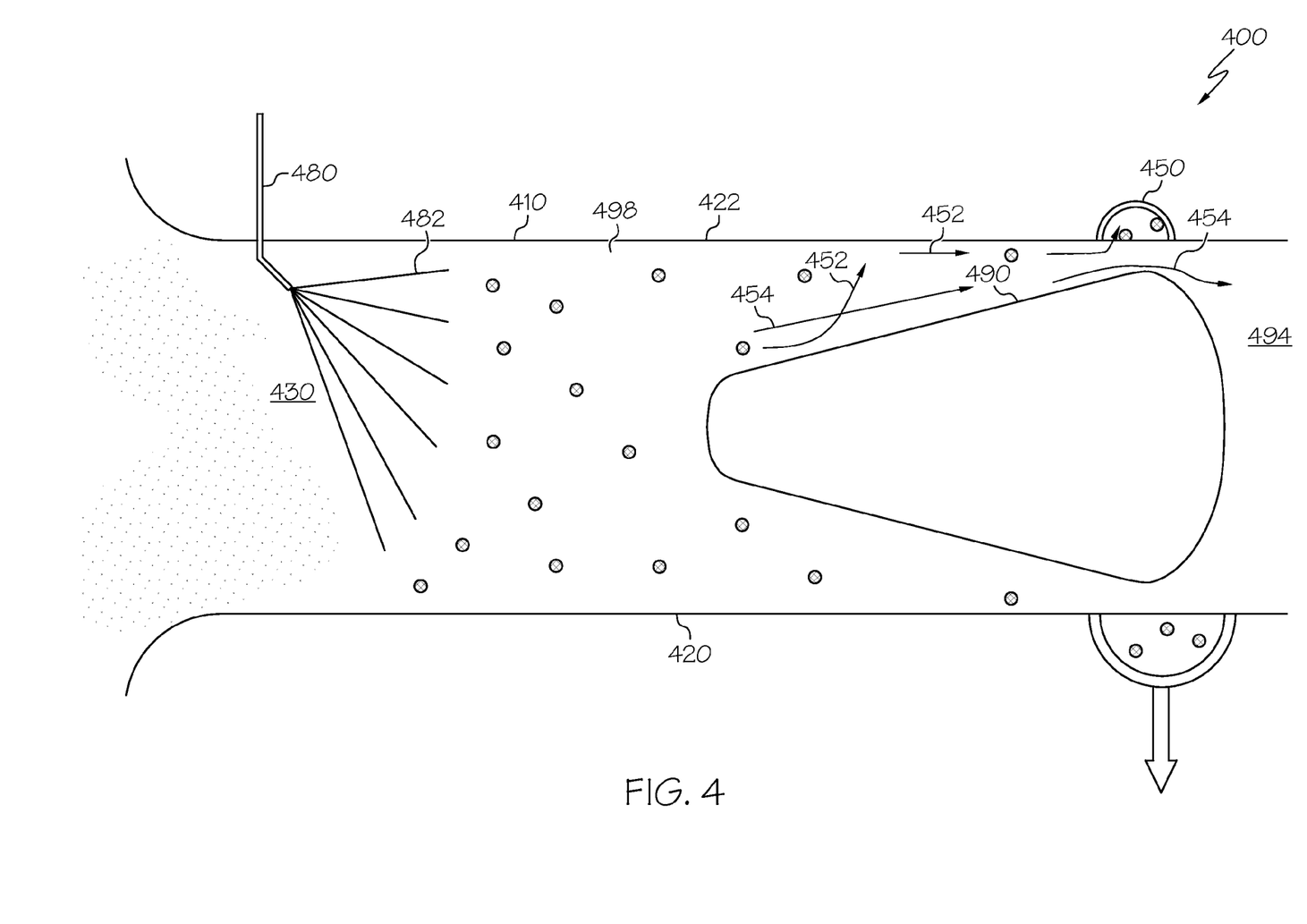
FIG. 4 is a partial, cross-sectional view of a separator system in accordance with another exemplary embodiment.

FIG. 4 is a partial cross-sectional view of a separator system 400 in accordance with another exemplary embodiment. In this embodiment, the separator system 400 includes a separator assembly 410 with a flow path 430 defined by a hub 420 and shroud 422, as above. Contaminated air enters the separator assembly 410 at an inlet flow path 430. A liquid injection system 480 (schematically shown) is positioned adjacent to the inlet of the inlet flow path 430 to introduce a stream or fog of atomized or diffused liquid 482 into the flow path 430. As above, the diffused liquid 482 functions to cluster or clump particles within the inlet air flow such that larger particles are formed. One or more mixing zones 498 may be provided to ensure adequate distance and time for the diffused liquid 482 to contact the particles and the particles to cluster together. Similarly, one or more swirlers (not shown) may be provided to ensure interaction of the diffused liquid and particles.

A center body or structure 490 is positioned within the flow path 430. The larger particles tend to flow around the center structure 490, towards the hub 420 and shroud 422. The cleaner air tends to flow around the center structure 490, but closer to the center structure 490 than the particles that are propelled by inertia or momentum towards the hub 420 and shroud 422. As the larger particles flow towards the hub 420 and shroud 422, the larger particles enter the collector assembly 450 as scavenge air 452. The collector assembly 450 may have any suitable configuration, although in one exemplary embodiment, the collector assembly 450 is configured as a scroll or partial scroll in which scavenge air 452 enters the collector assembly 450 and flows circumferentially around the collector assembly 450 to an outlet (not shown) and discharged. The cleaner air 454 flows around the center structure 490 and into an engine inlet 494, thereby resulting in a separation of the inlet air into the scavenge air and the clean air.

Figure 5:
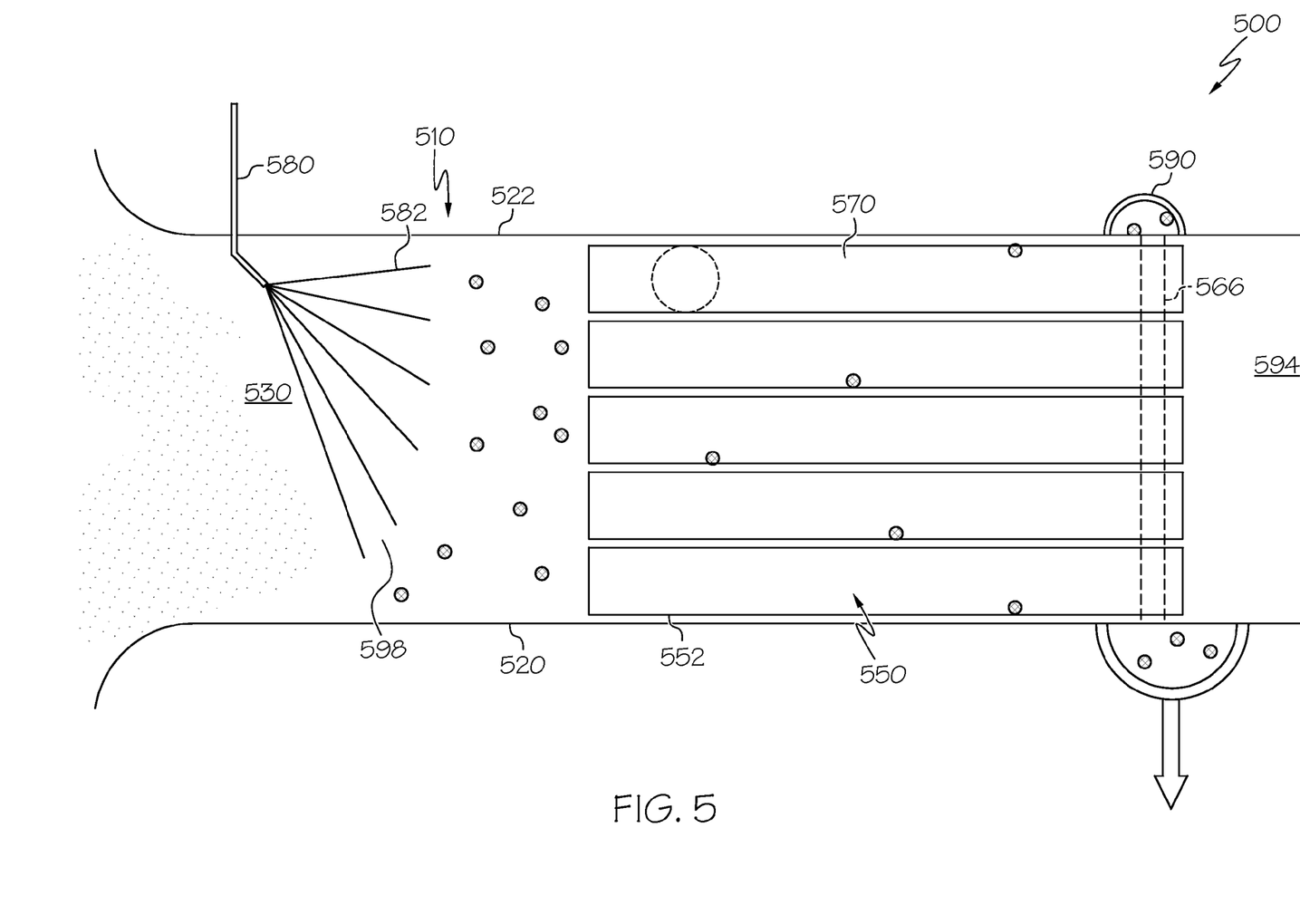
FIG. 5 is a partial, cross-sectional view of a separator system in accordance with another exemplary embodiment.

FIG. 5 is a partial cross-sectional view of a separator system 500 in accordance with another exemplary embodiment. In this embodiment, the separator system 500 includes a separator assembly 510 with a flow path 530 defined by a hub 520 and shroud 522, as above. Contaminated inlet air enters the separator assembly 510 at an inlet flow path 530. A liquid injection system 580 is positioned to introduce a stream or fog of atomized or diffused liquid 582 into the flow path 530. As above, the diffused liquid 582 functions to cluster or clump particles within the inlet air flow such that larger particles are formed. One or more mixing zones 598 may be provided to ensure adequate distance and time for the diffused liquid 582 to contact the particles and the particles to cluster together.

Figure 6:
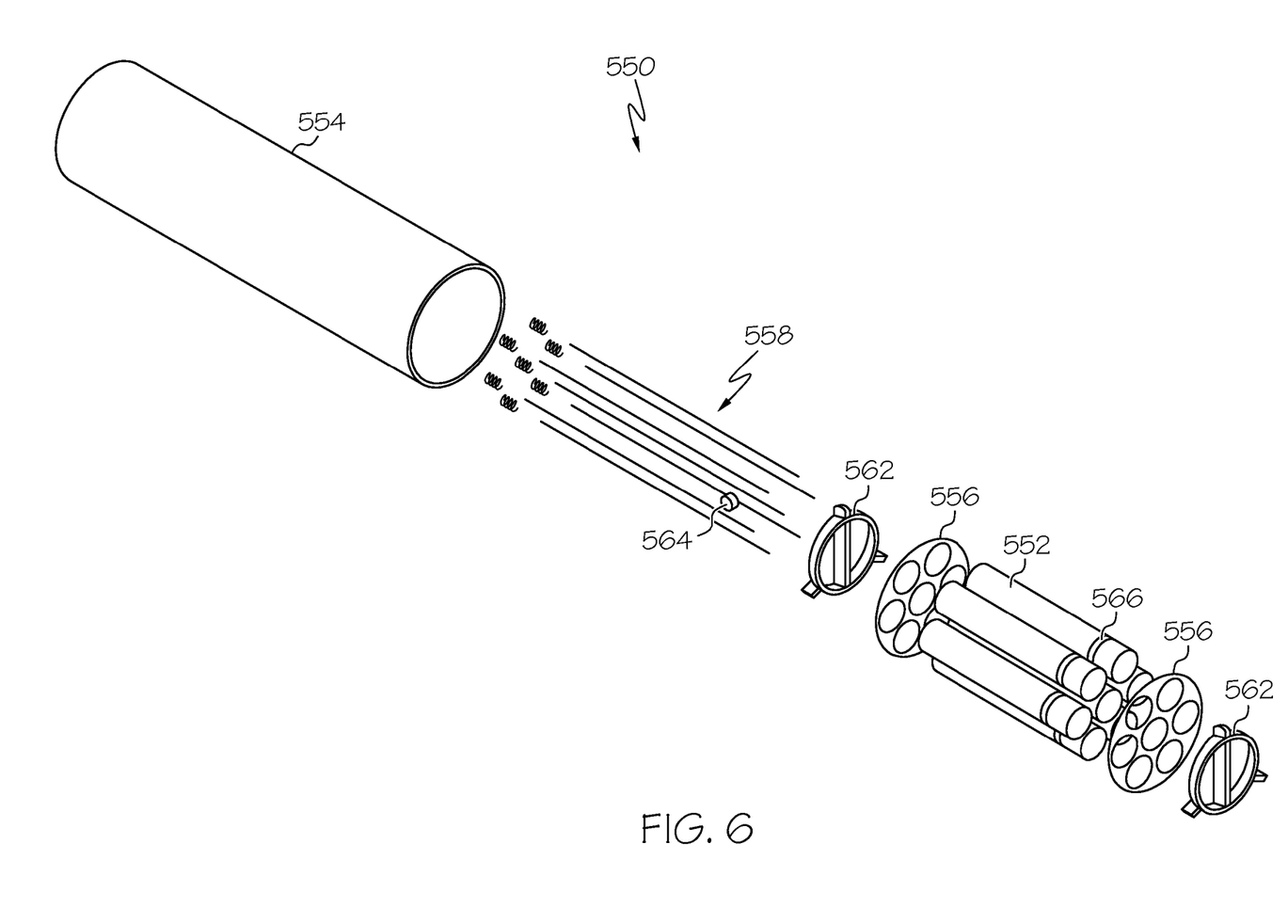
FIG. 6 is an exploded isometric view of an electrohydrodynamic (EHD) assembly of the separator system of FIG. 5 in accordance with an exemplary embodiment.

In this embodiment, the separator system 500 further includes an electrohydrodynamic (EHD) assembly 550 positioned within the flow path 532. Reference is briefly made to FIG. 6, which is an isometric exploded view of the EHD assembly 550 that may be incorporated into the separator system 500 of FIG. 5. Alternate embodiments may have a different configuration than the EHD assembly of FIG. 6.

Referring to FIG. 6, the EHD assembly 550 includes one or more EHD tubes 552 arranged within an outer tube or housing 554. The EHD tubes 552 are secured within the outer tube or housing 554 with face sheets 556. An electrode 558 extends through each of the EHD tubes 552 in a longitudinal or axial direction. The electrodes 558 are secured and positioned by springs 560 and electrode holders 562. A voltage connector 564 is electrically coupled to apply a voltage to each electrode 558 from a voltage source (not shown). As also shown in FIG. 6 and described in greater detail below, each EHD tube 552 may have a collector structure 566 for removing scavenge air, including particles, from the respective EHD tube 552. The collector structure 566 may, for example, be an aperture or series of apertures in the wall of the EHD tube 552. In other embodiments, the collector structure 566 may include a scoop or baffle to assist in the removal function. In general, the scavenge air may be removed by ejector, motorized fans, or pressures lower than that of the EHD tubes 552.

Referring again to FIG. 5, during operation, voltage is applied to the electrodes 558 to create an ionized flow area 570 within the EHD tubes 552. As the clustered particles, including the diffused liquid droplets, flow through the tubes 552, the particles collide with moving electrons and ions within the ionized flow area 570 to acquire an electric charge. The electric charge may be positive or negative. The EHD tubes 552 may have a length sufficient to ensure that the clustered particles are adequately charged.

Upon obtaining a charge, the particles will move away from the electrode 558 towards the edges of the EHD tubes 552, which may be grounded or of opposite polarity from the electrodes 558. As the particles move towards the walls of the EHD tubes 552, the particles may be collected along the edges of the EHD tubes 552 by the collector structures 566 that function to scoop or otherwise direct the particles moving along the EHD tubes 552 into a scavenge conduit 558 that is coupled to a collector assembly 590. The collector assembly 590 may have any suitable configuration, although in one exemplary embodiment, the collector assembly 590 is configured as a scroll or partial scroll coupled to a discharge outlet (not shown). The cleaner air tends to flow through the EHD tubes 552 and into an engine inlet 594, thereby resulting in a separation of the inlet air into the scavenge air and the clean air. In general, the particles in the EHD tubes 552 are collected as a result of the repulsion from the electrodes 558, although in other embodiments an opposing charge may be used to attract charged particles.

The voltage characteristics and system configuration may be based on a number of factors. Such factors may include, for example, inlet air composition, humidity, and desired engine air flow characteristics and requirements. In general, high voltage provides a higher repulsion effect, although excessive voltages may result in arcing across electrodes.

Although exemplary embodiments are described above with respect to an inlet particle separator system operating in vehicle applications, the exemplary embodiments may also be applied to particle separators operating in other applications. For example, inlet particle separator systems may be provided in power generation, mining applications, industrial applications, and the like. In some embodiments, the liquid injection systems and/or EHD collectors may be incorporated into existing inlet particle separator systems. As such, exemplary embodiments provide described systems and methods for the efficient removal of particles from inlet air.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An inlet particle separator system for a vehicle engine, comprising:
   a separator assembly defining an inlet flow path for receiving inlet air containing particles, the separator assembly including a scavenge flow path and an engine flow path downstream of the inlet flow path, the separator assembly configured to separate the inlet air into scavenge air and engine air such that the scavenge air is directed from the inlet flow path into the scavenge flow path and the engine air is directed from the inlet flow path into the engine flow path;
   a liquid injection system coupled to the separator assembly and configured to introduce a diffused liquid into the inlet air flowing through the separator assembly such that at least some of the particles within the inlet air cluster into clustered particles, the scavenge air including the clustered particles.

2. The inlet particle separator system of claim 1, wherein the liquid injection system includes a nozzle proximate to the inlet configured to introduce the diffused liquid.

3. The inlet particle separator system of claim 2, wherein the liquid injection system further includes a controller for selectively activating or deactivating the liquid injection system.

4. The inlet particle separator system of claim 1, further comprising a collector assembly coupled to the scavenge flow path and configured to receive the scavenge air.

5. The inlet particle separator system of claim 4, wherein the collector assembly is at least partially a scroll that surrounds the separator assembly.

6. The inlet particle separator system of claim 4, wherein the separator assembly further includes a center structure arranged in the inlet flow path downstream of the nozzle and configured to direct the scavenge air into the collector assembly.

7. The inlet particle separator system of claim 4, further comprising an electrohydrodynamic (EHD) assembly coupled to the separator assembly and configured to direct the scavenge air into the collector assembly.

8. The inlet particle separator system of claim 7, wherein the EHD assembly comprises a tube and an electrode extending through the tube.

9. The inlet particle separator system of claim 8, wherein a voltage is applied to the electrode such that particles are directed towards the tube.

10. The inlet particle separator system of claim 9, wherein the tube includes a collector structure to collect the particles.

11. A method for separating particles from inlet air in an inlet particle separator system defining an inlet flow path for a vehicle engine, the method comprising the steps of:
   introducing diffused liquid into the inlet air such that at least some of the particles within the inlet air cluster into clustered particles; and
   separating the inlet air into scavenge air entering a scavenge flow path and engine air entering an engine flow path, the scavenge air include the clustered particles.

12. The method of claim 11, wherein the introducing step includes introducing the diffused liquid into the inlet air with a nozzle.

13. The method of claim 11, further comprising the step of selectively activating or deactivating the introduction of the diffused liquid.

14. The method of claim 11, further comprising the step of collecting the scavenge air with a collector assembly coupled to the scavenge flow path.

15. The method of claim 14, wherein the collecting step includes collecting the scavenge air with the collector assembly that is at least partially a scroll that surrounds the separator assembly.

16. The method of claim 14, wherein the collecting step includes directing the scavenge air into the collector assembly with a center structure arranged in the inlet flow path.

17. The method of claim 14, wherein the collecting step includes directing the scavenge air with an electrohydrodynamic (EHD) assembly.

18. The method of claim 17, wherein the directing step includes directing the inlet air through tubes of the EHD assembly such that a charge is applied to particles within the inlet air.

19. The method of claim 18, wherein the collecting step further includes collecting the charged particles from the tubes as the scavenge air.

20. An inlet particle separator system for a vehicle engine, comprising:
   a separator assembly defining an inlet flow path for receiving inlet air containing particles, the separator assembly including a scavenge flow path and an engine flow path downstream of the inlet flow path, the separator assembly configured to separate the inlet air into scavenge air and engine air such that the scavenge air is directed from the inlet flow path into the scavenge flow path and the engine air is directed from the inlet flow path into the engine flow path;
   a liquid injection system coupled to the separator assembly and comprising a nozzle configured to introduce a diffused liquid into the inlet air flowing through the separator assembly such that at least some of the particles within the inlet air cluster into clustered particles, the scavenge air including the clustered particles; and
   an electrohydrodynamic (EHD) assembly coupled to the separator assembly and configured to direct the scavenge air into a collector assembly.

* * * * *